US011903471B2

(12) United States Patent
Norden et al.

(10) Patent No.: US 11,903,471 B2
(45) Date of Patent: Feb. 20, 2024

(54) RE-USABLE SHIPPING TAG FOR BAGGAGE

(71) Applicants: Andrew Norden, Manlius, NY (US); Noel Norden, Manlius, NY (US); Olivia Norden, Manlius, NY (US); Audrey Norden, Manlius, NY (US)

(72) Inventors: Andrew Norden, Manlius, NY (US); Noel Norden, Manlius, NY (US); Olivia Norden, Manlius, NY (US); Audrey Norden, Manlius, NY (US)

( * ) Notice: Subject to any disclaimer, the term of this patent is extended or adjusted under 35 U.S.C. 154(b) by 5 days.

(21) Appl. No.: 17/313,676

(22) Filed: May 6, 2021

(65) Prior Publication Data

US 2021/0361047 A1 Nov. 25, 2021

Related U.S. Application Data

(60) Provisional application No. 63/027,525, filed on May 20, 2020.

(51) Int. Cl.

*G09F 3/14* (2006.01)
*A45C 13/42* (2006.01)
*G09F 3/02* (2006.01)

(52) U.S. Cl.

CPC ................ *A45C 13/42* (2013.01); *G09F 3/14* (2013.01); *G09F 2003/0254* (2013.01)

(58) Field of Classification Search

CPC ... A45C 13/42; G09F 3/14; G09F 2003/0254; G09F 3/207; G09F 3/20; G09F 3/18; G09F 3/08; G09F 3/201; A44C 3/001
USPC .......... 40/6, 1.5, 1.6, 649, 651, 654.01, 661; 190/102
See application file for complete search history.

(56) References Cited

U.S. PATENT DOCUMENTS

| | | | | | |
|---|---|---|---|---|---|
| 973,300 | A * | 10/1910 | Praetz | G09F 3/18 40/653 |
| 1,795,233 | A * | 3/1931 | Rankin | G09F 3/14 40/662 |
| 2,811,797 | A * | 11/1957 | Teetor | G09F 3/04 D30/155 |
| 5,209,354 | A | 5/1993 | Thornhill et al. | |
| 5,395,667 | A | 3/1995 | Ohno et al. | |
| 5,912,981 | A | 6/1999 | Hansmire et al. | |
| 6,671,987 | B1 * | 1/2004 | Fenton | G09F 3/20 40/6 |
| D516,126 | S * | 2/2006 | Schantz | D20/28 |
| 7,013,589 | B2 | 3/2006 | Dickinson et al. | |
| 2005/0060791 | A1 * | 3/2005 | Garrett | A41F 9/002 2/311 |

(Continued)

FOREIGN PATENT DOCUMENTS

GB 2351961 A * 1/2001 ............ A45C 13/42

OTHER PUBLICATIONS

Federal Express Corp. "Domestic Label Creation Quick Start Guide" Jul. 6, 2016 (5 pages).

*Primary Examiner* — Gary C Hoge
(74) *Attorney, Agent, or Firm* — Bernhard P. Molldrem, Jr.

(57) ABSTRACT

A re-usable shipping tag that securely attaches to a handle of a baggage item, and allow a courier shipping label to be easily read and scanned. A zippered PVC transparent window affixed to the web of the shipping tab allows the courier shipping label or air bill to be easily scanned and read. A buckled strap permits the neck portion to be secured to the baggage handle.

17 Claims, 7 Drawing Sheets

(56) References Cited

U.S. PATENT DOCUMENTS

| | | | | |
|---|---|---|---|---|
| 2009/0008202 | A1* | 1/2009 | Dayton | A45C 13/08 190/110 |
| 2010/0306902 | A1* | 12/2010 | Bourque | A41D 27/08 2/244 |
| 2016/0183653 | A1* | 6/2016 | Warther | G06K 19/04 340/10.51 |

* cited by examiner

RE-USABLE SHIPPING TAG FOR BAGGAGE

This application claims domestic priority under 35 U.S.C. § 113(e) of U.S. Provisional Patent Application Ser. No. 63/027,525, filed May 20, 2020, the disclosure of which is hereby incorporated by reference.

This invention is directed to an improved, durable shipping tag that can be removably attached onto a handle of a suitcase or chest or other piece of baggage, or can be used with a salesman's sample case, musical instrument in its case; a set of golf clubs or a set of skis, or other item that a person may wish to ship via an overnight courier (such as Federal Express, United Parcel Service, DHL, or another shipping service). The shipping tag has a transparent window pocket that may have a zipper closure or other closure. The window pocket is dimensioned so as to hold the shipping label or so-called air bill for a given courier or shipping company, so that the addresses and other information on the face of the air bill is visible through the transparent window.

Currently, shipping providers such as Federal Express, DHL and UPS offer a one-use, three-piece arrangement for holding the shipping paperwork, i.e. air bill, and attaching itself to the handle of a suitcase, sample case, or other item. This existing system involves clear plastic sleeves to house the shipping labels or air bills, and these are adhesively attached to a Tyvek tag that is intended to wrap onto the luggage handle, and this is held in place with one or more plastic zip ties or cable ties. These items are intended for a single use, and cannot be used over and over for shipping to one destination and then to another. The shipper, i.e., the person sending luggage or other parcel along to a destination, cannot use these tags for both an outbound label and a return label. If a return trip is intended, or if the item is to be sent on to a second destination, then the shipper must prepare additional ones of these one-use tags and include them in the luggage (or other baggage item). This system creates paper waste and plastic waste, and is inefficient and cumbersome, especially for sending the package(s) along on a multiple-stop business trip or vacation.

In addition, the Tyvek tags and adhesive plastic sleeves that carry the shipping label or air bill are prone to handling damage, and the plastic sleeve and shipping label can be ripped off during transit, or the tags themselves can be completely torn away from the baggage because of courier mishandling, rough contact with other parcels, so that the luggage has no address or forwarding information, rendering the baggage directionless Consequently a need exists, and has existed, for a permanent, durable shipping tag that can securely attach to the handle of a piece of luggage or similar parcel, which can securely hold the air bill or shipping label for that parcel, and which can be re-used to return the parcel or to send it forward on another leg of the intended route. It is also desirable that the additional shipping labels/airbills can be stowed inside the tag and made visible through a transparent window on the tag for the respective leg of a journey. It is of course another object that the shipping tag be made of a suitable fabric or fabric-like material (a durable nylon, canvas, or leatherette material) and which can be created into an attractive, fashionable form.

Preferably, the shipping tag is provided with a larger window pocket on one side of the tag main body to accommodate the main shipping label (sometimes called an air waybill or air bill), showing address and other shipping information, and a smaller window pocket on the reverse side to accommodate a business card or perhaps another label containing addressee information for that parcel. Both of these window pockets may have a rectangular window of a sheet of clear PVC or other tough flexible transparent material that is attached on three sides to the body of the tag and with an openable side that may be sealed e.g. with a waterproof zipper closure. The neck or tongue of the tag can be wrapped around or behind the handle of the luggage item, and secured with snap closures and/or with hook-loop material closures (e.g. Velcro). In preferred embodiments a belt or strap is included to run along the neck or tongue portion of the tag, so that the tag can be securely buckled onto the luggage handle, but can be removed from the luggage at the destination without need for special tools. Thus, the shipping tag that houses the shipping label (air bill) as a scannable label with tracking information, easily straps onto the baggage item, using heavy-duty snap closures and/or hook-loop closures, as well as a strap that wraps and buckles around the handle of the item being shipped. Of great importance is that this durable shipping tag can be re-used again and again.

SUMMARY OF THE INVENTION

The shipping tag of our invention is designed to be able to withstand great forces that may be experienced during transit and handling, and to be used multiple times. The item has a body portion, favorably of a rectangular shape, and made of a durable heavy-duty fabric, favorably a single unitary piece of canvas, a ballistic nylon, leather or a leather-like material, with the body portion being about seven inches wide by about eighteen inches long, including both the main body portion and a neck or tongue portion that extends out from the main body. A large window pocket is secured onto a front surface or front side of the tag, and this is intended to house the shipping label or airbill, while a smaller window pocket on the opposite or back side can hold a supplemental address label, which may include bar-coded tracking information. The large window may be a rectangle of clear PVC cut to about 6½ inch by 9½ inch, with a clear plastic backing. This is affixed e.g. by sewing via a fabric frame onto the tag material on three sides with a fourth side having a zipper closure or similar openable and closable closure system. This can hold an address label, or a supplemental small shipping label with at least identification information on it. Male and female hook-loop material may be applied to the openable edge to secure the label inside this second window pocket. In a preferred embodiment, the tongue or neck extends substantially seven inches from the body portion. The main body portion is configured to hold a document such as a standard airbill, and is about five to eight inches wide and up to about nine inches long. The neck or tongue portion can be between about two and five inches wide.

Preferably, the neck or tongue is formed unitarily with the main body portion, and extends from a center portion of the upper edge of the body portion. A buckle is located and affixed onto the body portion near the base of the neck or tongue, and from there an apertured strap extends, and optionally may pass through lateral slots or openings in the tongue. When the main tongue or neck is fastened onto the luggage handle by the heavy-duty snaps or Velcro, the free end of the strap is pulled through the buckle, and the strap is then secured to the buckle.

The neck or tongue may be located at the top of the body portion, but alternatively may extend from one of the other sides. The body and neck may be made of any color material, and may thus be color-coded to help the recipient identify the particular luggage item.

BRIEF DESCRIPTION OF THE DRAWING FIGURES

DETAILED DESCRIPTION OF THE PREFERRED EMBODIMENT

Figure 1:
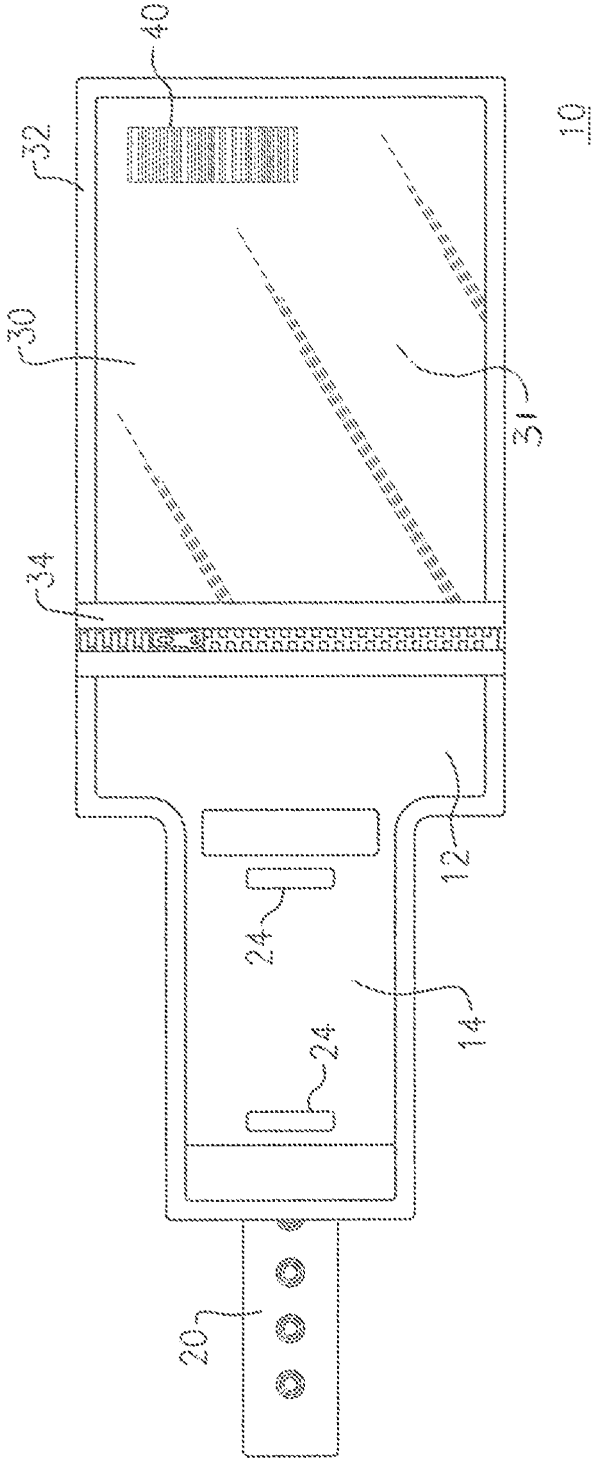
FIG. 1 is a front or obverse-side plan view of the re-usable shipping tag according to an embodiment of this invention.
Figure 2:
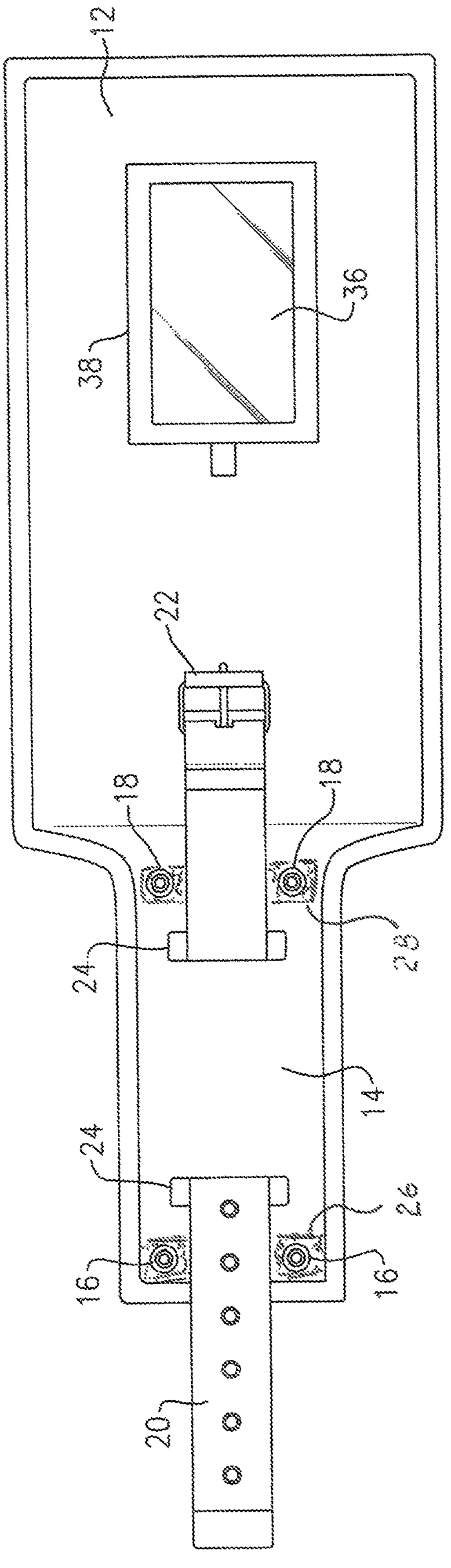
FIG. 2 is a rear reverse side view thereof.

With reference to the Drawing and initially to FIGS. 1 and 2 thereof, a shipping tag 10 according to this invention is comprised of a piece of durable, high strength but flexible synthetic fabric about twenty inches in length and about nine inches along. This is formed, i.e., cut into a relatively wide body portion 12 occupying about twelve inches in length, and a neck portion or tongue portion 14 extending about seven inches from the left, proximal end of the body portion 12. The tongue portion is about 3½ inches across, so it easily fits onto most if not all luggage handles.

FIG. 2 shows the reverse side of the shipping tag 10, featuring the underside of the tongue or neck 14 which is the side that contacts the luggage handle when in use. Here there are shown a pair of male snap fasteners 16 near the free end of the tongue portion 14, and a corresponding pair of female snap fasteners 18 positioned at or near where the tongue portion departs from the body portion. A perforated strap 20 is positioned to extend along the center of the tongue portion, and is sewn in place to the body portion 12 at or near the juncture of the body and tongue portions. A buckle 22 is held at the body end of the strap, and the strap 20 extends to and beyond the tongue portion 14. In this embodiment, the strap 20 passes through consecutive open transverse slots 24 in the tongue portion 14.

Complementary hook-and-loop faster strips, e.g., Velcro, 26 and 28, respectively, can be positioned at ends of the strap 20 along the body portion and at the remote end, as seen in FIG. 2.

Figure 5:
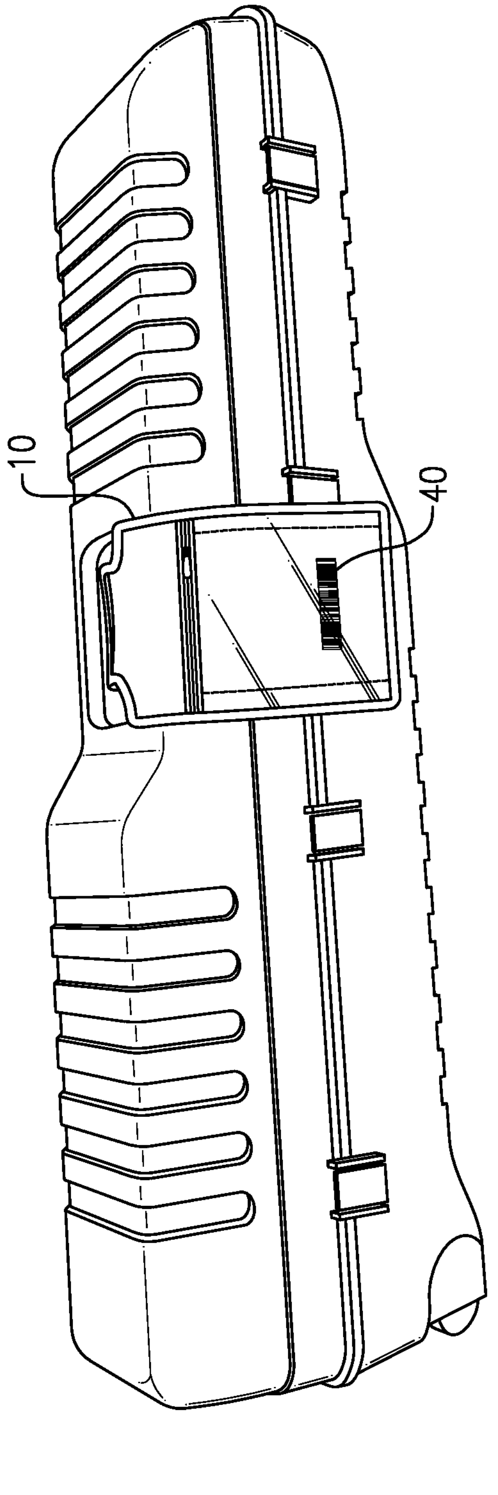
FIGS. 5 and 6 are illustrations of the shipping tag of the present invention strapped to the handle of a golf club hard case, and musical instrument case, respectively.
Figure 6:
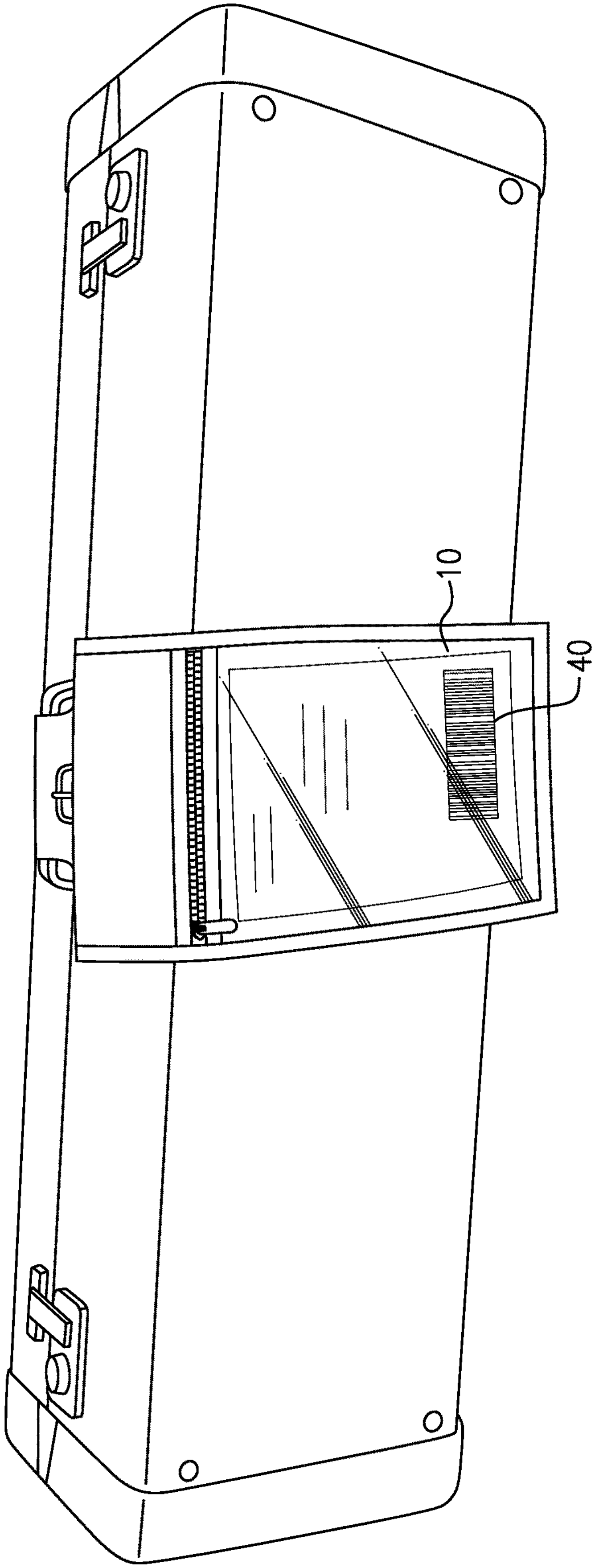

Returning to FIG. 1, the body portion 12 of the tag is seen as possessing a window pocket 30 that extends across the width of the body portion 12 and from the end of the body portion to a transverse closure 34. In this case the closure is a zipper 34. A fabric frame 32 extends along three edges of the window pocket 30 and fastens the clear rectangular transparent plastic window 31 to the fabric of the body portion. The zipper 34 extends across the remaining edge of the transparent plastic window 31 of the window pocket 30. The zipper 34 can unzip to allow the user to insert the appropriate shipping label or so-called air bill, so that a bar-coded symbol 40 on the air bill is visible in the window and can be optically scanned. The bar coded symbol may include a tracking code. The zipper can then close to seal the pocket 30 shut. The strap 20 has a series of grommeted openings along its center line to engage the tongue piece of the buckle 22, and can be pulled tight against the luggage handle after the neck or tongue portion is secured to the handle by securing the male and female snap fasteners 16, 18. This arrangement presents the shipping tag 10, for example, to a hard case golf bag handle, as seen in FIG. 5 or to the handle of a case, such as the case of a musical instrument e.g. a saxophone or trombone, as seen in FIG. 6. Either way, the tag presents the shipping air bill through the large window 31 so it can be scanned to identify the package and its destination automatically. Here, the drawing is lined to show the window is one piece and transparent.

On the reverse side of the body portion 12 a small window pocket 36 is affixed, with a transparent rectangular clear window surrounded by a fabric frame 38, being about three inches by four inches in dimension. This can hold a supplemental identification, such as a business card. It is possible to insert here a bar-coded sticker that may provided.

Figure 3:
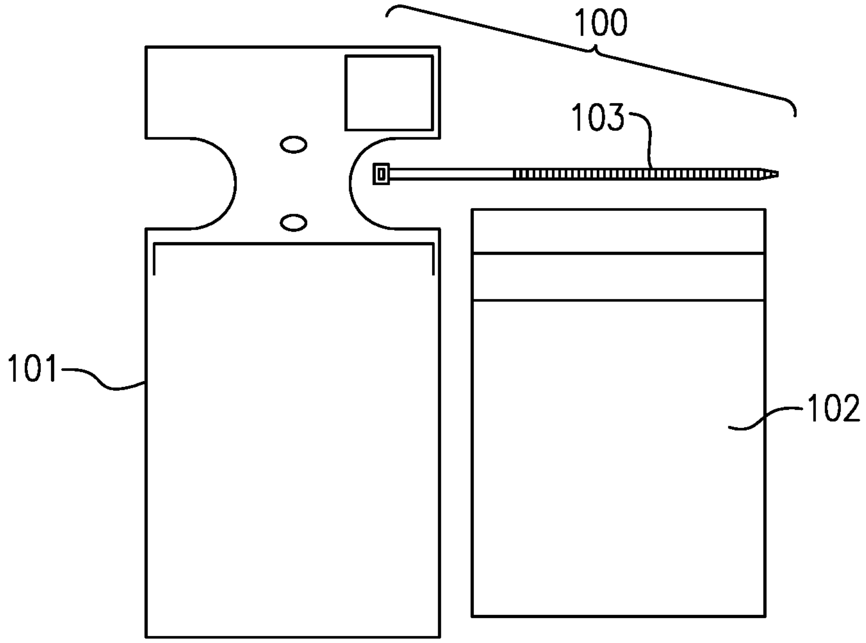
FIG.3 Prior Art
FIG. 3 is an illustration of a one-time-use shipping tag of the prior art.
Figure 4:
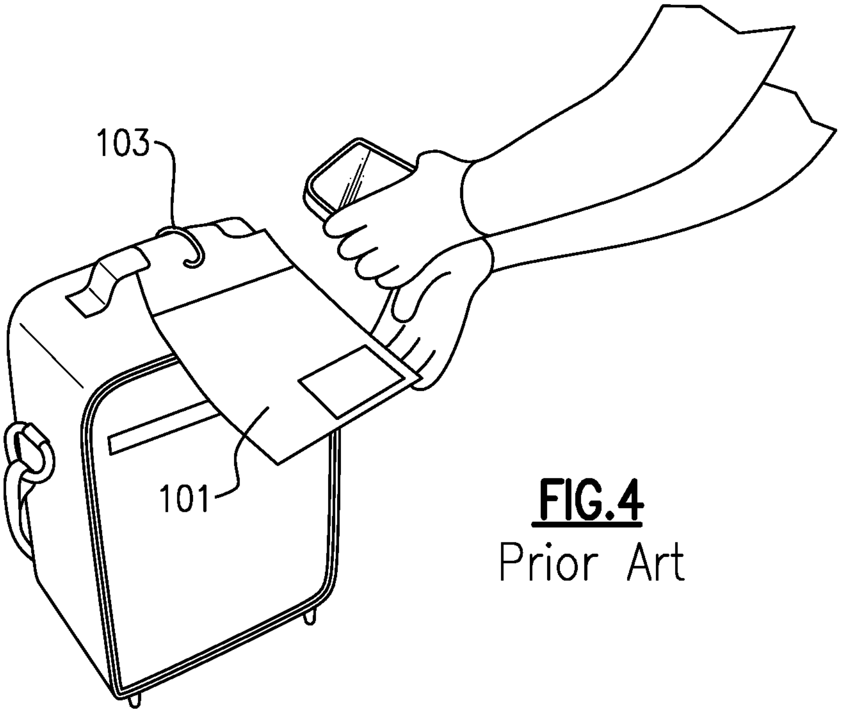
FIG.4 Prior Art
FIG. 4 is an illustration of the prior art shipping tag arrangement applied to a baggage handle.

An example of the prior-art one-use tag 100 is shown in FIGS. 3 and 4. Here FIG. 3 shows the three parts namely a Tyvek sheet 101, which has a flat rectangular area to which a transparent shipping envelope can be attached to hold the air bill. The Tyvek sheet 101 is cut to form a relatively narrow neck with round opening, through which an associated zip tie 103 can be threaded. The zip tie 103 goes through the openings in the neck portion and is intended to secure the shipping tag to the handle of a piece of luggage, as shown in FIG. 4. This prior art system requires obtaining new materials each time one wants to send a package by courier. The zip tie has to be cut to remove it from the parcel, and the zip tie cannot be re-used. This therefore also creates waste that needs to be disposed of by the recipient. Moreover, the clear plastic enclosure for the shipping label or air bill can come apart from the Tyvek sheet while in transit, making it difficult or impossible for the courier to determine the destination for the package or parcel.

Figure 7:
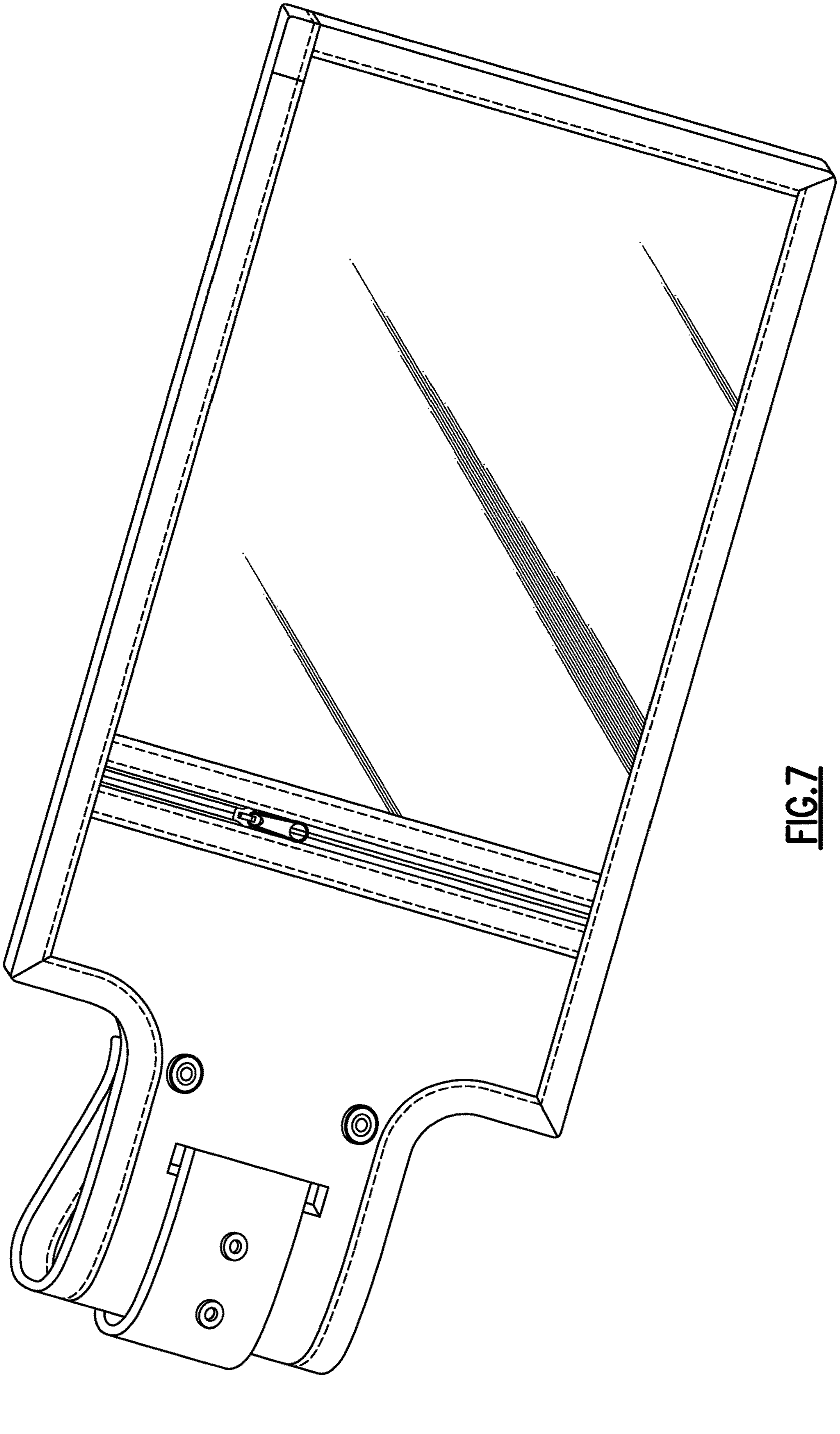
FIGS. 7 and 8 are perspective views of this embodiment showing each side and edge.
Figure 8:
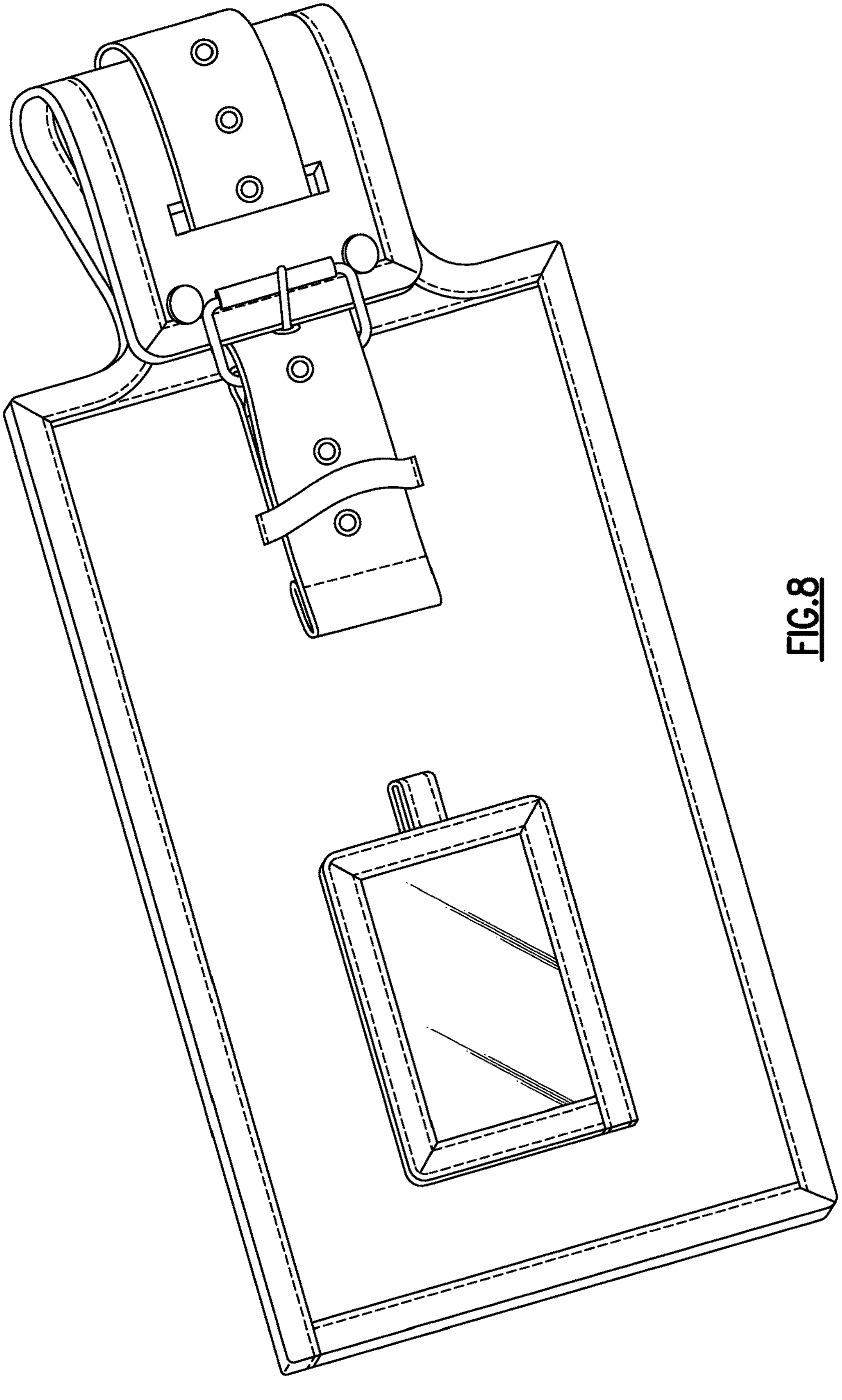

FIGS. 7 and 8 are perspective views that serve to round out the disclosure and provide a better understanding of the construction of the item.

Many variations are possible, including variations in size and relative proportions of the body and tongue portions, and variations in materials bo be better suited for difference packages and parcels.

We claim:

1. A re-usable shipping tag for baggage where said baggage includes a handle on which a baggage tag can be attached, comprising a flat flexible web of a durable fabric material having a body portion and a neck portion, a transparent label window affixed onto the body portion and forming with the web a pocket dimensioned so as to accept a shipping label of at least five by eight inches and permit the label to be visible through said label window, said transparent label window being free of any cover or obstruction so that information on said shipping label is always visible through said label window and information thereon can be scanned automatically to identify the baggage and its destination;

one edge of said label window being openable and closable to permit a said shipping label to be inserted into and removed from said pocket, at least one closure element on said neck portion to permit the neck portion to be closed over said handle of said baggage, and a belt disposed on said neck portion and adapted to strap securely over said handle and to be removed therefrom for subsequent re-use.

2. The re-usable shipping tag according to claim 1, further comprising a second transparent window on a side of the body portion opposite said label window.

3. A permanent, re-usable shipping tag for baggage items or similar item(s) that have a handle or other closed loop, and adapted for removably attaching to the handle or other closed loop and configured for displaying therein a shipping label such that all shipping information on said shipping label is visible and can be automatically scanned; comprising:

a flat, flexible fabric member having a main body portion that is generally rectangular having side edges, a proximal edge and a distal edge and a tongue portion extending proximally from a center portion of the proximal edge of the main body portion;

said main body portion having a width corresponding at least to the width of said shipping label;

said main body portion being between about five to eight inches by about nine to twelve inches;

said tongue portion having a width selected to fit through or behind a handle on said baggage item or similar item, and said selected width being between two to five inches;

a window pocket affixed onto one side of said body portion, formed of a rectangle of a durable flexible transparent film, extending across the body portion between the side edges, and from a distal end thereof to a transverse closure that extends across the body portion between the two side edges, the rectangle of durable flexible transparent film being at least five inches by eight inches and permitting the shipping information on the shipping label to be visible and scannable and being free of any cover or obstruction such that information on said shipping label is always visible therethrough; and one or more closures for securing said tongue portion onto the handle or other closed loop of said luggage item or other similar item, including a strap having a buckle end affixed to said body portion and a free end that extends beyond the proximal end of said tongue member.

4. The shipping tag of claim 3, further comprising a second window pocket affixed onto said body portion on a side opposite to said one side.

5. The shipping tag of claim 3, wherein said second window pocket has dimensions of three by four inches.

6. The shipping tag of claim 3, wherein said tongue extends substantially seven inches from said body portion.

7. The shipping tag of claim 3, comprising a buckle at said buckle end of said strap, and said strap including perforations spaced along said strap.

8. The shipping tag of claim 7, wherein said tongue member has slots at spaced positions along the tongue member and configured for said strap to be threaded through.

9. The shipping tag of claim 3 wherein said transverse closure of said window pocket includes a zipper closure.

10. The shipping tag of claim 3 wherein the first-mentioned window pocket includes a frame that extends around said rectangle of durable flexible transparent film and is secured to said rectangle and to said body portion.

11. The shipping tag of claim 3, wherein said means for securing said tongue portion includes snap fasteners affixed onto said tongue portion at positions near said body portion and remote from said body portion.

12. The shipping tag of claim 3, wherein said means for securing said tongue portion includes hook and loop fastener strips on said tongue portion at positions near said body portion and remote from said body portion.

13. A permanent, re-usable shipping tag for baggage items or similar item(s) that have a handle or other closed loop, and adapted for removably attaching to said handle or other closed loop and configured for displaying therein a paper shipping label such that shipping information on said shipping label is always visible and automatically scannable; comprising:

a flat, flexible fabric member having a main body portion that has at least one side edge, and a tongue portion extending from a center portion of said side edge;

said main body portion having a width corresponding to the width of a said paper shipping label;

said tongue portion having a width narrower than said body portion and selected as long enough to fit through or behind the handle or other closed loop on said baggage item or similar item;

a window pocket affixed onto one side of said body portion, formed of a rectangle of at least five by eight inches of a durable flexible transparent film, extending across the body portion, and with a transverse closure that extends across one edge of said rectangle of durable transparent film; and with said window pocket being free of any cover or other obstruction such that information on said shipping label is at all times visible behind said rectangle of transparent film, and automatically scannable therethrough;

means for removably securing said tongue portion onto the handle or other closed loop of said luggage item or other similar item and wherein said window pocket includes a narrow fabric frame that extends around said rectangle of durable flexible transparent film and of said body portion, and is sewn to three edges of said rectangle and to said body portion, with said transverse closure being sewn to a fourth edge of said rectangle.

14. The shipping tag of claim 13, further comprising a second window pocket affixed onto said body portion on a side opposite to said one side, wherein said second window pocket has dimensions of substantially three by four inches.

15. The shipping tag of claim 13, wherein said tongue extends from said body portion to a free end, and further comprising a strap having a buckle end affixed to said body portion and a free end that extends beyond the free end of said tongue member, said strap having reinforced openings along its length and a buckle at said buckle end of said strap.

16. The shipping tag of claim 13, wherein said transverse closure includes a zipper closure.

17. The shipping tag of claim 13, wherein said means for securing said tongue portion includes snap fasteners affixed onto said tongue portion at positions near said body portion and mating snap fasteners mounted on said tongue portion remote from said body portion.

* * * * *